United States Patent

[11] 3,625,124

[72] Inventor Seinan Miyakawa
Tokyo-to, Japan
[21] Appl. No. 836,928
[22] Filed June 26, 1969
[45] Patented Dec. 7, 1971
[73] Assignee Asahi Kogaku Kogyo Kabushiki Kaisha
Tokyo-to, Japan
[32] Priority July 3, 1968
[33] Japan
[31] 43/45879

[54] SHUTTER TIMING MECHANISM USING INVERSE FEEDBACK CIRCUIT
6 Claims, 1 Drawing Fig.

[52] U.S. Cl. .................................................. 95/10 C,
250/214 P, 333/14
[51] Int. Cl. ..................................................... E01c 7/10
[50] Field of Search........................................ 250/214 P,
206; 95/10 C; 333/14; 328/145

[56] References Cited
UNITED STATES PATENTS
3,086,179 4/1963 Powers........................ 333/14
3,213,391 10/1965 Kovalevski et al............ 333/14
3,347,141 10/1967 Nobusawa et al............. 250/206 X
3,422,356 1/1969 Fritts............................ 333/14
3,439,280 4/1969 Hochrath...................... 333/14 X
3,479,525 11/1969 Harford......................... 333/14 X Primary Examiner—Walter Stolwein
Attorney—Stanley Wolder ABSTRACT: A light responsive shutter control comprises a control circuit including a photoconductor coupled to a log compression network, a variable resistance network and a transistor network providing an output responsive to the resistances of the photoconductor and resistance network. The control circuit output charges a memory capacitor connected across the input of a high input impedance amplifier whose output controls a current control transistor whose output electrode is connected to a voltage source through a log expansion network. The output of the current control transistor is connected in inverse feedback to the control circuit and to indicating means and alternatively to a shutter release control transistor switch.

PATENTED DEC 7 1971
3,625,124
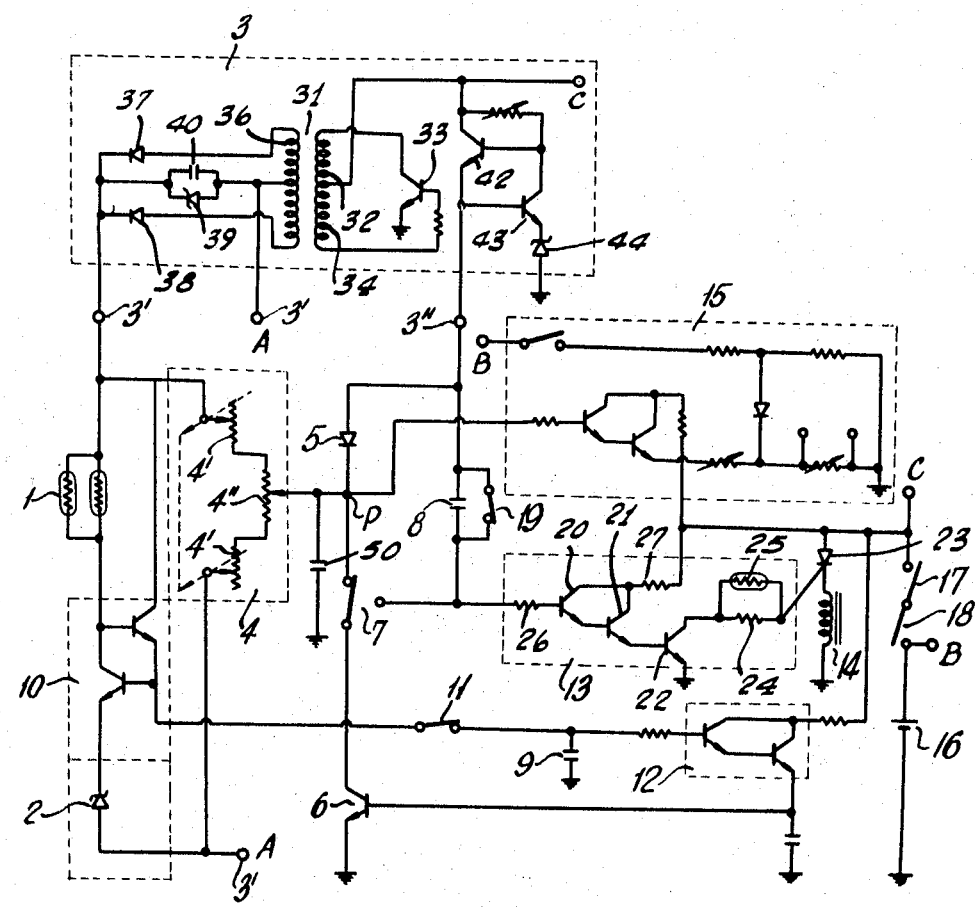
INVENTOR
SEINAN MIYAKAWA
BY Stanley Wolder
ATTORNEY

3,625,124

SHUTTER TIMING MECHANISM USING INVERSE FEEDBACK CIRCUIT

BACKGROUND OF THE INVENTION

The present invention relates generally to improvements in automatic shutter timing mechanisms and it relates particularly to an improved network for memorizing a parameter related to light conditions and employing such parameter in controlling the shutter exposure interval of a camera.

In the automatic control of shutter exposure time, for proper results not only the brightness of the scene to be photographed which is determined by a suitable photosensitive element but also the other photographing conditions such as the sensitivity value of the film used and the present value of the diaphragm opening should be taken into consideration particularly, when the automatic shutter is in a single lens reflex camera employing the so called TTL photometric system in which the light measurement is accomplished by a photosensitive element that is positioned in the path of light coming through the objective from a scene to be photographed. Photographing is usually carried out, in view of the particular characteristics of such a camera, with a present value of diaphragm under the control of an automatic diaphragm mechanism wherein the diaphragm is fully open for preparatory operations such as viewing a scene to be photographed and focusing so that the exposure time cannot be controlled by the photometric measurement during said preparatory operations unless at least the preset value of the diaphragm is considered with the photometric measurement. Furthermore with the TTL photometering system in a single lens reflex camera, if the photosensitive element is located in the light path for the view finder, light incident upon said element is interrupted during the release operation. In the control of the shutter open time, there must be temporarily memorized photographing parameters based on the brightness of the scene to be photographed just before the operation of shutter release at least until the shutter starts to close.

SUMMARY OF THE INVENTION

It is a principal object of the present invention to provide an improved automatically timed camera shutter.

Another object of the present invention is to provide an automatic camera shutter which responds to incident light measured before the opening of the shutter.

Still another object of the present invention is to provide an improved information storage and retrieval network for controlling the timing of an automatic shutter in response to light incident on the camera immediately prior to the opening of the camera shutter.

A further object of the present invention is to provide an improved light responsive shutter timing controlling network in a single lens reflex camera employing a through-the-lens light measuring system.

Still a further object of the present invention is to provide a network of the above nature characterized by its reliability and compactness.

The above and other objects of the present invention will become apparent from a reading of the following description taken in conjunction with the accompanying drawing which illustrates a preferred embodiment thereof.

In a sense the present invention contemplates the provision of an automatic shutter timing mechanism comprising a control network including a light responsive section including a photosensitive element and a log compression circuit and a variable resistance adjustment section and means for combining the outputs of said sections, a memory capacitor chargeable in response to said control network, an amplifier network responsive to the charge on said memory capacitor connected in inverse feedback to said control network and comprising an output section including a current control device and a log expansion element, and shutter closure release means responsive to said current control device. The preferred embodiment of the improved network includes a photoconductor and a diode connected in series through one pair of input terminals of a transistor comparator circuit, a variable resistor network for adjustment for photographing parameters other than incident light being connected across the other input terminals. The comparator circuit output is connected through a switch to a memory capacitor which is connected to the input of a high-impedance input amplifier the output of which is connected to the base of a current control transistor. The control transistor is connected through a selector switch in series with a log expansion diode to a supply voltage and in inverse feedback phase to the variable resistance network and alternatively to the input of a solid-state switch controlling the shutter closure release. An indicator network is also connected to the current control network through the selector switch.

The improved network is highly versatile, reliable and accurate.

BRIEF DESCRIPTION OF THE DRAWING

The drawing is a circuit diagram of a shutter control network embodying the present invention.

DESCRIPTION OF THE PREFERRED EMBODIMENT

Now, referring to the drawing which illustrates the circuit diagram of a preferred embodiment of the present invention, a photosensitive element 1 such as a photoconductor is located in path of light traversing the camera objective from a scene to be photographed (for example, in the path of light for view finder). Photosensitive element 1 and a diode 2 are connected to outputs 3' and 3' of a power source 3 in series with each other. A variable resistance network 4 serving as a mechanism for the adjustment for photographing parameters other than the brightness of scene to be photographed includes a variable resistance pair 4' of which the resistance may be adjusted depending upon the sensitivity or speed value of film used and another variable resistance 4'' of which the resistance may be adjusted depending upon the set value of diaphragm. A diode 5 is connected to a constant-voltage output terminal 3'' of power source 3 and is in series with a current control transistor 6 at a current varying junction point P which is connected to said resistance group 4. A double throw changeover switch 7 is connected between log expansion diode 5 and current control transistor 6 and is normally closed to establish a connection between diode 5 and transistor 6. Switch 7 is mechanically coupled to the camera so that upon operation thereof a timing capacitor 8 and transistor 6 are serially connected to constant-voltage output terminal 3'' and the other pole of switch 7 opened. A memory capacitor 9 is connected through a switch 11 to a data combining output section 10 of the photoelectric circuit controlled by photosensitive element 1 and the variable resistance group 4 and possesses an electric charge according to the combined output of section 10. A transistor amplifying section 12 of high-input impedance receives the terminal voltage of memory capacitor 9 across its input so that feedback of its emitter current to the base of current control transistor 6 is effected. A switching circuit 13 subject to the control of timing capacitor 8 is adapted to control the energizing an electromagnetic mechanism 14 which starts the shutter closing. An exposure time indicator section 15 is adapted to apply a data signal to any suitable indicating load (for example, a meter or the like) connected outputs 15'' and 15'' of indicator section 15 depending upon the signal input from the current varying point P. Furthermore, numerical reference 16 designates a source battery, similarly, 17 a source switch, 18 a synchronizing switch, and 19 a short-circuit switch.

Re: Switching Circuit (13)

Transistors 20, 21 constitute a Darlington circuit, that is employed to increase input impedance. Transistor 22 is for switching and, to its base, the collector of said transistor 21 is connected. The collector of the transistor 22 is connected to the control electrode (gate) of thyristor 23 that is further connected to electromagnet 14 in series. Between the collector of the transistor 22 and the gate of thyristor 23, resistance 24 for controlling voltage directed to said gate and thermistor 25 for compensation of temperature are arranged in parallel.

Sensing rising of voltage between terminals of condenser 8, the circuit comprising the transistors 20, 21 turns on. Since the circuit including the transistor 20 is a high-input impedance circuit, it has very little influence on the condenser 8 both before and after the circuit turns on. As voltage between the terminals of the condenser 8 is rising, collector voltage of the transistor 22 in the switching circuit 13 rises. Resistance 24 and other resistances 26, 27 are set in this circuit, so that said collector voltage reaches a value suitable for triggering the thyristor 23 when the voltage between terminals reaches a predetermined value.

Parallel arrangement of the resistance 24 and the thermistor 25 makes it possible to trigger the thyristor 23 in accordance with the predetermined value of the voltage between the terminals, without being affected by temperature of surrounding atmosphere.

Re: Power Source Circuit (3)

The reference numeral 31 indicates a transformer, the primary coil of which is connected, at one end, to the input end C extending from the power source 16, and to the collector of the transistor 33 at the other end. The reference numeral 34 indicates a feedback coil wound on the primary coil 32, and output of the feedback coil is directed to the portion between the collector bases of the transistor 33. The emitter of said transistor 33 is earthed. Said primary coil 32, feedback coil 34 and transistor 33 constitutes an oscillation circuit.

The secondary side of the transformer consists of a secondary winding 36 provided with an intermediate terminal. Both of the output ends of said secondary winding 36 are connected to commutating elements 37, 38 respectively. Between said intermediate terminal and the anode connecting point that is common to said commutating elements, a Zener diode 39, is arranged. In parallel to said Zener diode 39, a filter condenser 40 is arranged. This constitution presents DC—DC converter for full-wave rectification of secondary output from the transformer 31, and is capable of keeping output voltage constant.

At the output end C, a well-known constant voltage output circuit comprising transistors 42, 43 is constituted. Between the emitter of transistor 43 and the earth of the power source a Zener diode 44 for stabilizing voltage is inserted. Log expansion is carried out by a system comprising the diode 5, condenser 50 connected in series to said diode 5 and the transistor 6 as resistance.

The operation of the improved network is hereinafter described. When the source switch 17 is closed with synchronizing switch 18 upon a complete advance of a film frame, photoelectric current corresponding to the light incident on the photosensitive element 1 flows in the photoelectric circuit connected to the outputs 3' and 3' of the power source section 3 under the influence of the diode 2, while the current controlled by the variable resistance group 4 in which the resistance values have been preadjusted depending upon the sensitivity of film used and the adjusted value of the diaphragm is applied together with said photoelectric current to the data combining output section 10. Output section 10, therefore, applies the signal according to photographing parameters such as brightness of the scene to be photographed, value of the film sensitivity and adjusted value of the diaphragm to the transistor amplifying section 12 under the closed state of the switch 11. Consequently, amplifying section 12 applies its emitter current corresponding to said input signal to the base of the current control transistor 6, so that current control transistor 6 is balanced upon reaching the state current controlled in accordance with said photographing parameters. The current control circuit of transistor 6 additionally has the diode 5 serially connected thereto, so that a voltage varying in arithmetical progression in response to said photographing parameters develops at the current varying point P in said circuit. This state is maintained by the actions of the memory capacitor 9 which is charged in response to data output of data combining output section 10 and transistor amplifying section 12. When, in this state, operation of the shutter is initiated immediately after the memory storage has been completed, the switch 11 being opened at the first stage of depression of the shutter button for initiating the shutter release. Memory capacitor 9 is, therefore, freed from the influence of subsequent data output. Upon further depression of the shutter button, the changeover switch 7 is changed over in operative association with the stage in the start of the shutter release, such as the stopping down operation of an automatic diaphragm mechanism in a single lens reflex camera or the retraction movement of a reflex mirror so as to connect the current control transistor 6 with the timing capacitor 8. A current which traverses transistor 6 under the control of the memory capacitor 9 storing the photographing parameter information based on the brightness of the scene to be photographed just before shutter release and the amplifier 12 is applied to the timing circuit comprising capacitor 8. In this condition, however, capacitor 8 is not charged since the short-circuit switch 19 remains closed. When short-circuit switch 19 is opened concurrently with the shutter opening operation, the timing capacitor 8 is charged with the current controlled by transistor 6 whereby the switching circuit 13 is actuated by the capacitor timer operation in a well known manner and controls the electromagnetic mechanism 14 so as to initiate the shutter closing.

In the operation of the improved network described above the current through transistor 6 is controlled in response to the nonlinear data combined output signal which is produced by adding the secondary parameters to the primary photographing parameters subjected to photoelectric current log compression, but the current control is accomplished in such a manner that a voltage at the current varying point P varies as an arithmetical progression depending upon the photographing parameters due to the action of the diode 5 so that the shutter is subjected to a proper control of exposure time by the capacitor timer operation that occurs when the timing circuit is formed by operation of changeover switch 7.

MOreover, in view of characteristics at the current varying point P, as described above, if the exposure time predicting indicator 15 is actuated by the voltage at point P as an input signal and any suitable indicating load such as meter is connected to the output terminals 15' and 15' of indicator 15, the automatically set exposure time may be easily ascertained. It should be noted that, although in the embodiment described above a transistor is employed as the current control element, other devices may be employed such as an arrangement in which a photosensitive element is exposed to an electric bulb in which the illumination of said bulb is variable depending upon the feedback current.

While there has been described and illustrated a preferred embodiment of the present invention, it is apparent that numerous alterations, omissions and additions may be made without departing from the spirit thereof.

What is claimed is:

1. An automatic shutter timing mechanism comprising a control network including a light responsive section including a photosensitive element and a log compression circuit and a variable resistance adjustment section and means for combining the outputs of said sections, a memory capacitor chargeable in response to said control network, an amplifier network responsive to the charge on said memory capacitor connected in inverse feedback to said control network and comprising an output section including a current control device and a log expansion circuit, and shutter closure release means responsive to said current control device.

2. The timing mechanism of claim 1 wherein said photosensitive element comprises a photoconductor and said log compression circuit comprises a diode in series connection with said photoelement.

3. The timing network of claim 1 wherein said current control device comprises a transistor including an output electrode and said log expansion circuit comprises a diode connected to an output electrode of said transistor, the output of said inverse feedback amplifier being derived from said transistor output electrode.

4. The timing network of claim 1 wherein said closure release means comprises a timing capacitor, means for alternatively connecting the output of said current control device to said control network and to said timing capacitor and a shutter closure release member responsive to the change on said timing capacitor.

5. The timing network of claim 1 including indicating means responsive to said current control device.

6. An electric shutter comprising a photoelectric current circuit including a photosensitive element located in the path of light coming through an objective from a scene to be photographed and a log compression circuit serially connected to said photosensitive element, a current control circuit including a current control element such as a transistor and a log expanding circuit serially connected to said current control element, a variable resistance group of which resistance values are adjustable depending upon photographing requirements other than brightness of the scene to be photographed inserted in parallel into a data output terminal of said photoelectric circuit, a memory section including a capacitor for memory and an amplifying circuit of high-input impedance through which memory section a feedback of combined output of the data output of said photoelectric circuit and the data output of said variable resistance group to a control pole of said current control element is effected, and a timing capacitor for accomplishing the control of exposurement time with control current of said current control element for which said feedback is held during shutter release.

* * * * *